UNITED STATES PATENT OFFICE.

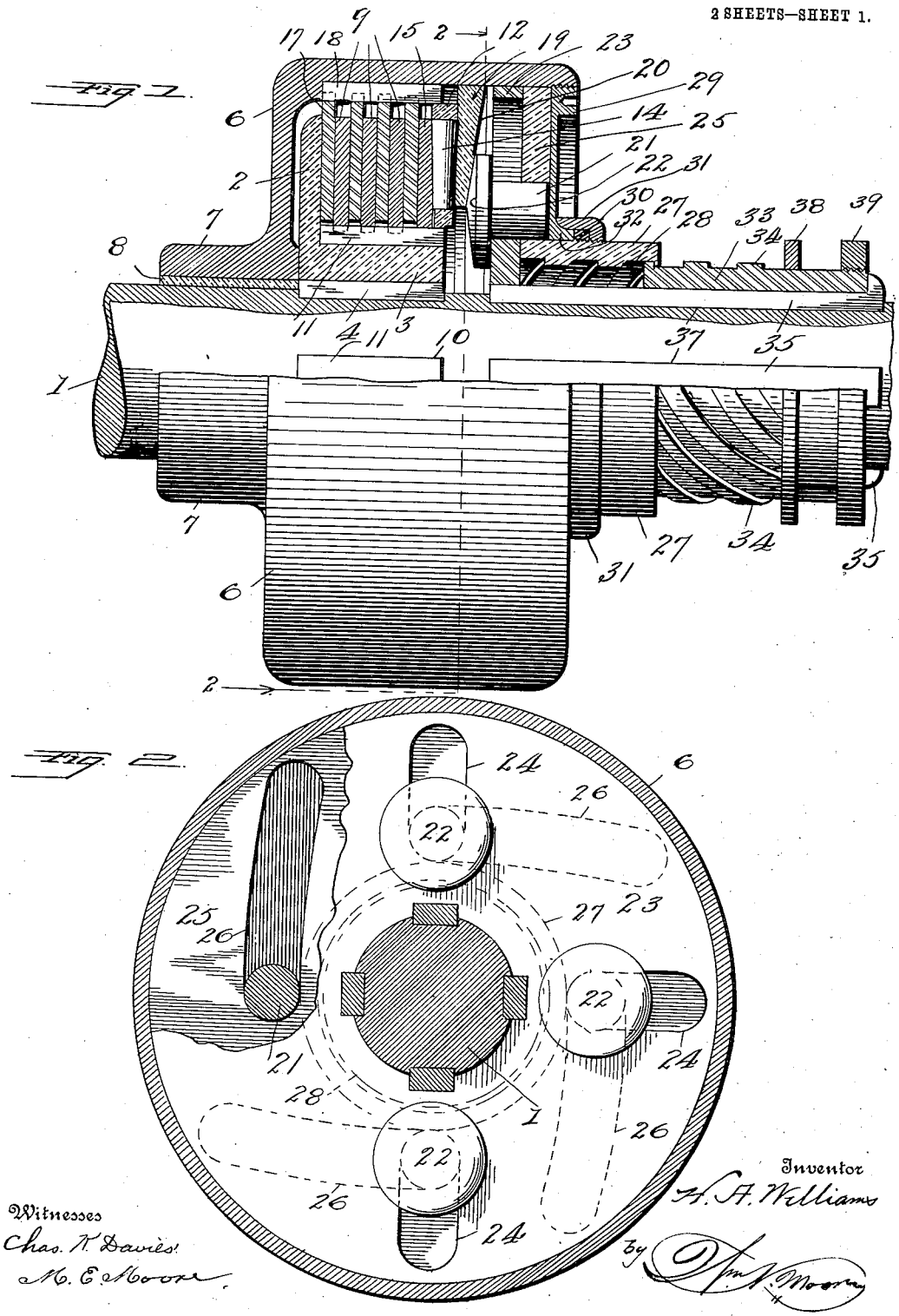

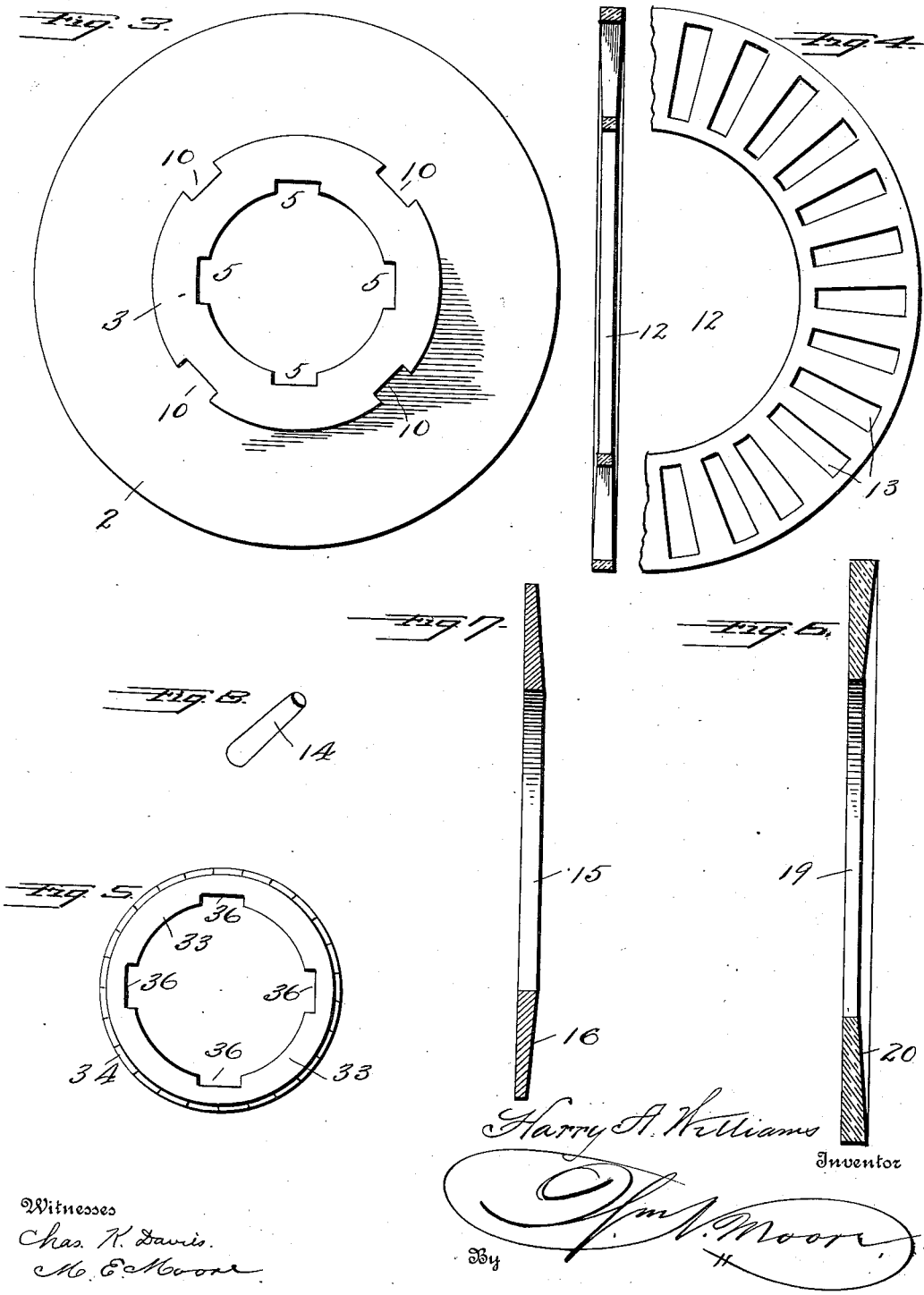

HARRY A. WILLIAMS, OF AKRON, OHIO.

CLUTCH.

No. 860,590.  Specification of Letters Patent.  Patented July 16, 1907.

Application filed July 25, 1906. Serial No. 327,679.

*To all whom it may concern:*

Be it known that I, HARRY A. WILLIAMS, a citizen of the United States, residing at Akron, in the county of Summit and State of Ohio, have invented certain new and useful Improvements in Clutches, of which the following is a specification.

My present invention relates to improvements in clutches, of the general class known as friction disk clutches, and has for its object the provision of a clutch mechanism especially intended for use with the speed transmission gears as applied to automobiles.

When applied to mechanism as above mentioned, or other mechanism wherein the present invention is applicable, the device produces an efficient, strong, and durable clutch, which will adapt itself to wear and is not likely to become deranged.

The invention consists in certain novel features of construction and combinations and arrangements of parts as hereinafter described, illustrated in the accompanying drawings, and more clearly pointed out in the claims.

In the practical application of the invention the driven or loose member may be a gear wheel or other power transmission medium to which the device for driving is attached.

In the accompanying drawings I have illustrated one example of the physical embodiment of the invention constructed according to the best mode I have so far devised for the practical application of the principles.

Figure 1 is a view of so much of the mechanism as a whole as is necessary to illustrate the invention, part of the clutch members being shown in elevation and part in section. Fig. 2 is a transverse view on line 2—2 Fig. 1. Fig. 3 is a face view of the driving hub which is rigidly attached to and revolves with the main shaft of the clutch mechanism. Fig. 4 illustrates a disk termed the thrust roller guide, the same being shown in vertical section and partially in plan. Fig. 5 is a face view of the shifting collar employed in the mechanism. Fig. 6 is a cross section of one of the thrust disks. Fig. 7 is a sectional view of a second thrust disk, and Fig. 8 is a perspective detail view of a thrust roller, a suitable number of which are held in slots in the roller guide illustrated in Fig. 4.

Referring to the drawings, the numeral 1 designates a driving or transmission shaft, which may be driven by suitable power, and in this description will be termed the driving shaft; 2, a driving hub or disk mounted rigidly on the shaft and rotatable therewith; 3, the hub of the driving disk; 4, keys, preferably four in number, located in complementary slots in the driving shaft and projecting into slots or recesses 5 in the interior face of the driving disk hub; 6, the driven member, which in this instance is illustrated as a cup shaped casing, and in my application before referred to, is shown as provided with gear teeth on its outer periphery; 7, the hub of the driven member; 8, a bronze bushing or friction ring interposed between the driving shaft and the hub of the driven member; 9, a series of friction rings, three in number, each provided with four recesses or slots at their inner openings; 10, a series of four recesses or grooves cut in the outer periphery of the driving disk hub, and complementary to the recesses in the friction driving rings 9; 11, four keys, located in the grooves 10 and projecting into the recesses in the friction driving disks 9, to lock the friction disks in connection with the hub of the driving disk so that the friction driving disks, the driving disk, and the driving hub rotate together; with the driving shaft; 12, an open center disk, with inclined faces, as clearly illustrated in Fig. 4, and provided with a series of slots 13 radiating from a central line or center of the open disk, the disk being termed a thrust roller guide; 14, a series of thrust rollers of a tapered shape or conical in form, of a diameter slightly greater than the thickness of the roller guide disk 12, and adapted to be seated in the slots of said guide; 15, a thrust disk having an open center and provided with an inclined face 16; 17, a series of friction driven disks, four in number, preferably of bronze, provided with a series of recesses in their outer peripheries, and arranged alternately to bear against the steel driving friction disks 9; 18; four keys located in grooves in the interior surface of the wall of the driven member and projecting into the recesses in the driven friction disks, to lock the driven member in connection with the friction driven disks; 19 a second thrust roller disk, greater in diameter than the disk 15, and provided with an inclined face 20; 21, a series of four rollers; 22, flattened conical heads on the rollers; 23, a flat, circular guide member; 24, a series of four slots, radiating on diametrical lines from the center of the guide member 23, in which the rollers 21 are adapted to travel; 25, the disk portion of a cam and shifting nut; 26, a series of four slots, located eccentrically in the disk portion 25 and extending from a point toward the center of the disk to a point near the periphery thereof, and together with the slots 24 adapted to receive the rollers 21 which travel therein; 27, the hub portion of the member 25 provided with screw threads on its exterior surface; 28, interior screw threads on the hub; 29, an adjusting nut of disk shape with screw threads adapted to engage interior screw threads at the edge of the driven member; 30 a felt collar; 31, a dust collar and lock nut adapted to engage the threads on the exterior of the hub 27, and close over the felt collar 30 and a flange 32 on the adjusting nut 29; 33, a shifting collar; 34, spiral threads on the exterior of said collar, adapted to engage the interior threads on the hub 27; 35, four keys or feathers located in grooves 36 on the interior of the collar or sleeve 33, and also in grooves 37 in the driving shaft 1, to permit a longitudinal sliding movement of the collar, but not a rotary movement; and 38 and 39, are a pair of thrust collars, between which a lever arc is located to move said collar laterally.

The elements composing the driving member of the clutch are the shaft 1, driving disk and hub 2 and 3, and the driving friction rings 9. The driven elements and members are the casing 6 operated through the driven disks 17, thrust rings 15 and 19, the rollers 25 and their guide plate or ring 12. The clutch actuating mechanism consists of the shift 33, threaded hub 27 and its disk 25, the rollers 21, and roller guide disk 19. The actuating elements may be adjusted to take up wear by means of the adjusting nut 29, as will be readily understood. When the clutch members are not in engagement, the elements composing the driving member of the clutch rotate with the driving shaft, the driven member and connections remaining idle, and the actuating mechanism out of operative position.

To engage the clutch and carry the driven member or casing 6 with the rotation of the driving shaft 1, the shift collar 33, which is traveling with the shaft 1, while the hub 27 is at rest, is moved laterally, by a lever located between the collars 38 and 39. The longitudinal or lateral movement of the shift collar causes the threads 34 thereon to engage with the interior threads 28 of hub 27, causing the hub to revolve and with it the disk portion 25. It will be observed clearly in Fig. 2 that the rollers 21 are seated in the slots 24 of the disk 23 and also in slots 26 of the disk 25. Thus the revolution of the hub 27 with disk 25, tends to move the rollers 21 outwardly by reason of centrifugal force, and they travel radially in the grooves 25 and eccentrically to the shaft 1 in the grooves 26, always toward the periphery of the casing 6. As the rollers travel outwardly their heads 22 contact frictionally with the inclined face 20 of the disk 19, and as the rollers ride up said incline with increased frictional contact the disk 19 is moved to the left in Fig. 1 and at one side contacts with the tapered rollers 14 in the roller guide disk or plate 12. The tapered rollers in turn engage the inclined face of the disk 15, and as the rollers 21 move outwardly these members are pressed farther to the left until the driven friction disks and driving friction disks are moved into close frictional contact with each other and the outermost disk 17 with the driving disk 2, and the driving hub being itself driven from the driving shaft drives the driven member through the contact between the driving friction disks and the driven friction disks, the latter being located to the casing 6. A withdrawal of the collar 33 from hub 27 permits the hub 27 to again become idle, and through the discontinuance of its revolution the rollers 21 are no longer acted upon by centrifugal force return to their positions as shown in Fig. 2, withdrawing pressure from the thrust disk 19 and permitting the friction members to become disengaged, and the driven member is allowed to come to a stand still.

From the above description taken in connection with the drawings it becomes obvious that I have produced a friction clutch which fulfils all the conditions set forth as the object of my invention.

Having thus fully described my invention, what I claim as new and desire to secure by Letters Patent is:

1. The combination with a driving member and actuating mechanism adapted to rotate therewith, of a driven member adapted for frictional engagement with the driving member, a pressure member, a disk rotatable with the driving member and provided with slots; rollers, with bearing surfaces, in said slots; and an eccentrically slotted guide member in which said rollers travel.

2. The combination with a driving member and actuating mechanism roatable therewith, of a driven member and alternating friction disks carried by each said member, and centrifugally operated wedging rollers carried by the actuating mechanism for bringing said friction disks into frictional contact.

3. In a clutch, the combination with a driving member and a driven member, of a driving disk and friction driving disks carried thereby, driven friction disks carried by the driven member, a thrust ring, a roller guide ring having slots, rollers in said slots, a second thrust ring and centrifugally operated actuating mechanism for bringing said members into frictional contact.

4. The combination with a driving member and a driven member, and means for frictional engagement therebetween, of a thrust ring having an inclined face, a roller guide having slots, rollers in said slots, a second thrust ring, and centrifugally operated mechanism for engaging the frictional means through the thrust rings and rollers.

5. The combination with a driving member and a driven member, and means for frictional engagement therebetween, of a pair of thrust rings, a roller guide ring having slots therein located between said thrust rings, rollers in the slots engaging the thrust rings, and means for bringing said frictional means into engagement through the thrust rings.

6. The combination with a driving member and a driven member, and means for frictional engagement therebetween, of a pair of thrust rings, a roller guide member provided with slots, rollers in said slots, and centrifugally operated actuating mechanism for exerting pressure on said thrust rings to drive the driven member.

7. In a clutch, the combination with a driving member and a driven member, and frictional engagement means therebetween, of a pair of thrust rings, and rollers guided between said rings; a disk carried by the driving member having eccentric slots therein, rollers in said slots having heads to engage a thrust ring, and means for moving said latter rollers whereby their pressure on the thrust ring operates to drive the driven member.

8. A clutch actuating mechanism consisting of a driving member, a loose shifting member, means for connecting said driving member and shifting member, and centrifugally operated means movable eccentrically carried by said shifting member, combined with the driven member of the clutch.

9. The combination with a driving member and a driven member, of a loose shifting member, means for connecting said shifting member with the driving member, frictional means for engagement between the driving and driven members, eccentrically movable means carried by the shifting member, and thrust members interposed between said movable means and the frictional means.

10. The combination with a driving member and a driven member, of a shifting member and means for operatively connecting the same with the driving member, movable rollers carried by the shifting member, a guiding member having eccentric guiding means engaging the rollers, and means acted on by the rollers to engage the driving and driven members.

11. In a clutch, the combination with a driving shaft and driven member of a slotted shifting member, means for operatively connecting said shifting member to the driving shaft, headed rollers in the slots of the shifting member, a slotted guide member and eccentric slots in said member engaging the rollers, and acted on by said rollers for driving the driven member.

12. In a clutch, the combination with a driving shaft and a driven member, of a loose shifting member, wedging rollers carried thereby for engaging the driven member, and means carried by said shaft for moving the shifting member to operative engagement to drive the driven member.

13. In a clutch, the combination with a driving shaft and driven member, of a loose shifting nut provided with threads, a threaded collar carried by the shaft and movable thereon to engage the threaded nut, and means carried by said shifting nut and actuated by said shaft to drive the driven member.

14. In a clutch, the combination with a driving shaft and frictional driving plates connected thereto, of a driven member carrying driven frictional plates, of a loose shifting nut provided with threads, a threaded collar carried by the shaft and movable thereon to engage said nut, and means carried by said shifting nut and actuated by the shaft for bringing the driving and driven frictional plates into frictional contact to drive the driven member.

15. In a clutch actuating mechanism, the combination with a driving shaft and a driven member means for frictional engagement therebetween, of a shifting nut having screw threads and provided with eccentric slots, a collar rotatable with the shaft and movable to rotate said nut, and rollers having bearings in said slots.

16. In a clutch actuating mechanism, the combination with a driving shaft and driven member means for frictional engagement therebetween, of a loose rotatable nut having threads, and provided with eccentric slots, rollers having bearings in said slots, a slotted guide plate for said rollers, and a laterally movable collar rotatable with the shaft, adapted to engage and rotate said nut.

17. In a clutch, the combination with a driven member and a driving shaft means for frictional contact therebetween, of a loose rotatable member provided with eccentric slots, rollers in said slots, a guide plate having slots engaging said rollers, a pair of thrust rings, a slotted plate between said rings, friction members located in the slots of the guide plate and bearing on the thrust rings, and said rollers formed with heads to bear on one of said thrust rings.

18. In a clutch, the combination with a driven member and a driving shaft means for frictional contact therebetween, of a loose rotatable member provided with eccentric slots and a guide plate having radial slots, a roller having bearings in each said slots, and a laterally movable collar rotatable with said shaft, for rotating said loose member.

19. The combination with a driven member and a driving shaft of a loosely rotatable nut provided with eccentric slots, a guide member provided with radial slots, a roller engaging each said slots, a collar rotatable with the shaft, and laterally movable to engage said nut, a pair of thrust rings, friction members therebetween, an inclined face on one of said rings, and conical shaped heads on said rollers adapted to engage said inclined surface.

In testimony whereof I have signed my name to this specification in the presence of two subscribing witnesses.

HARRY A. WILLIAMS.

Witnesses:
J. R. VAUGHAN,
JOEL G. PHIPPS.